March 7, 1967 R. G. SCOTT, JR 3,307,994
CORRUGATED PAPERBOARD AND METHOD OF MAKING THE SAME
Filed June 30, 1964 2 Sheets-Sheet 1
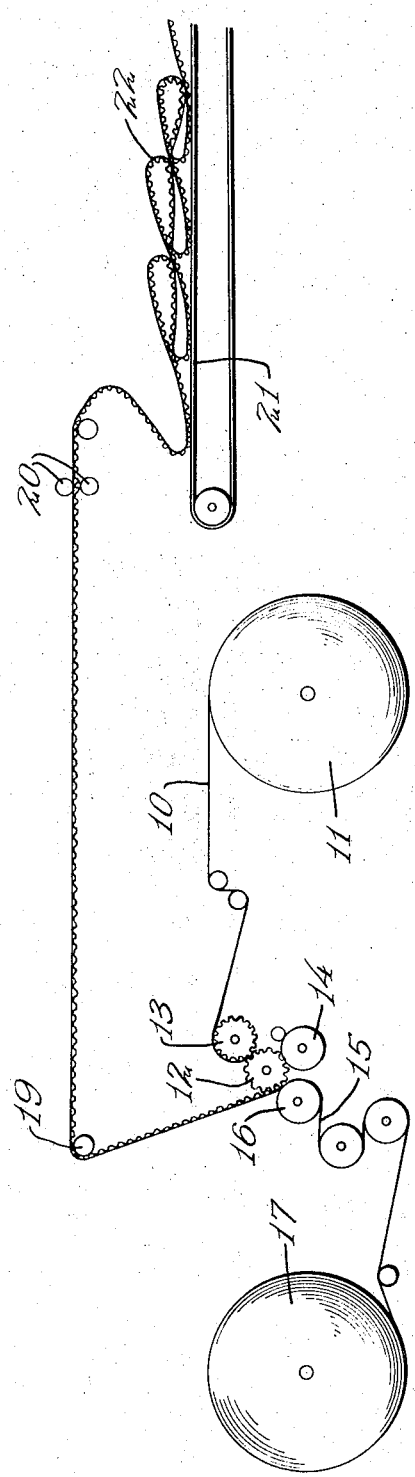
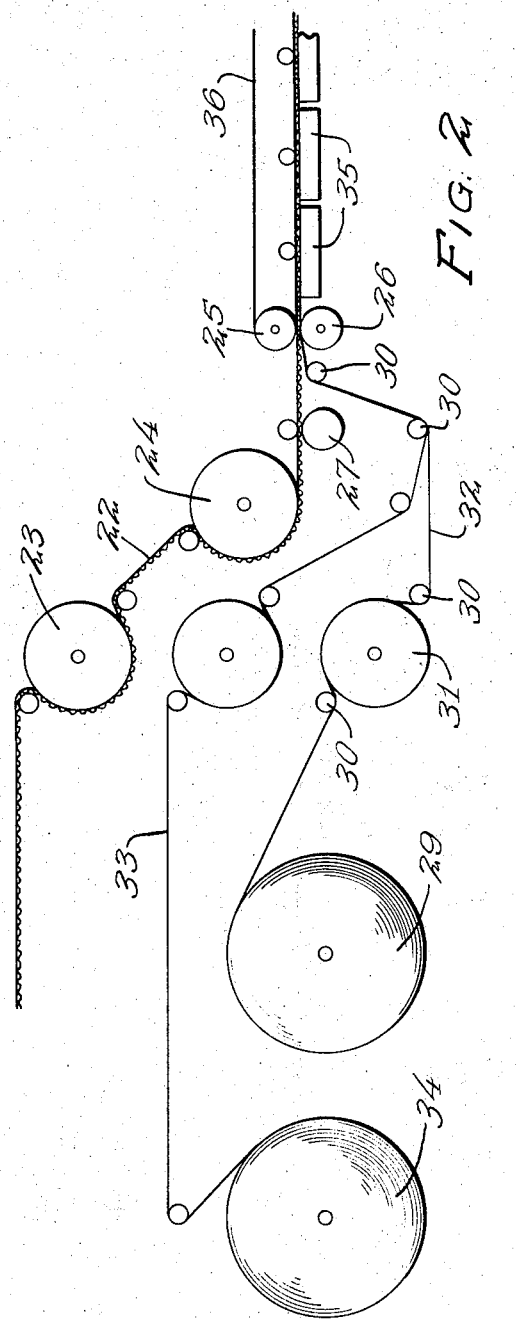
INVENTOR
RAYMOND G. SCOTT, Jr.
BY
ATTORNEY March 7, 1967  R. G. SCOTT, JR  3,307,994
CORRUGATED PAPERBOARD AND METHOD OF MAKING THE SAME
Filed June 30, 1964  2 Sheets-Sheet 2

INVENTOR
RAYMOND G. SCOTT, Jr.
BY Robert M. Dunning
ATTORNEY

United States Patent Office 3,307,994
Patented Mar. 7, 1967

3,307,994
CORRUGATED PAPERBOARD AND METHOD OF
MAKING THE SAME
Raymond G. Scott, Jr., Edina, Minn., assignor to Waldorf Paper Products Company, St. Paul, Minn., a corporation of Minnesota
Filed June 30, 1964, Ser. No. 379,094
7 Claims. (Cl. 156—210)

This invention relates to an improvement in corrugated paperboard and method of making the same, and deals particularly with the use of a polyolefin film for securing a liner to a corrugated medium.

Polyethylene-coated liners have been used in the production of corrugated paperboard. These webs are normally used in a conventional manner by adhering the paper side of the web to the corrugated medium. This arrangement is employed where the surface of the container is to be subjected to moisture, and provides a relatively moisture-proof covering to the paperboard. In some instances, both liners are similarly coated so that the opposite side of the completed corrugated paperboard has a moisture-proof surface.

In some instances, there is a disadvantage in having the surface completely moisture-proof. For example, in containers used to contain certain meats and poultry, it is very important that the moisture be prevented from leaking into the corrugated medium, but it is advantageous that the liner forming the inner surface of the corrugated board be slightly absorptive so that moisture can soak into this liner to prevent free moisture from collecting on this liner.

This is accomplished by fabricating the corrugated board with the plastic coated surface in contact with the corrugated medium. When the idea of fabricating the corrugated board in this manner was conceived, it was not felt to be particularly practical because of the cost of the adhesives used in securing the plastic film to the paper. However, when the idea was tried, it was found that the plastic film itself could be used for bonding the liner to the corrugated medium. After a double-face corrugated web has been formed, it is carried by conveyor belts traveling over heated metal plates, the corrugated web normally being carried for a considerable distance under such conditions. It was found that it was possible to heat the liner in its travel to the extent necessary to render the polyolefin tacky and to provide a bond between the liner and the corrugated medium. As a result, the use of the adhesive in these areas could be eliminated.

It is an object of the present invention to provide a corrugated board in which at least one of the liners is coated with polyethylene or another polyolefin film and in which the film forms the bond between the liner or liners and the corrugated medium.

It is a feature of the present invention to provide a method of forming corrugated board which comprises applying a film of polyethylene or similar material between a corrugated liner and a corrugated medium in order to bond the medium to the liner and to produce a corrugated board in which the liner may absorb moisture, but the moisture is prevented from entering the corrugated medium due to the film.

A further feature of the present invention lies in the provision of a container having a tubular side wall structure, a closure flap hinged to the edges of said tubular container to provide end closures, and to provide a film of moisture-proof material embodied in the central portion of the blank including the wall panels of the container and marginal portions of the closure flaps closely adjoining the wall panels.

These and other objects and novel features of the present invention will be more clearly and fully set forth in the following specification of claims.

Part of the specification, FIGURE 1 is a diagrammatic side elevational view of a machine for forming single-faced corrugated paperboard.

FIGURE 2 is a diagrammatic side elevational view of an apparatus for forming a double-faced corrugated paperboard.

Figure 3:
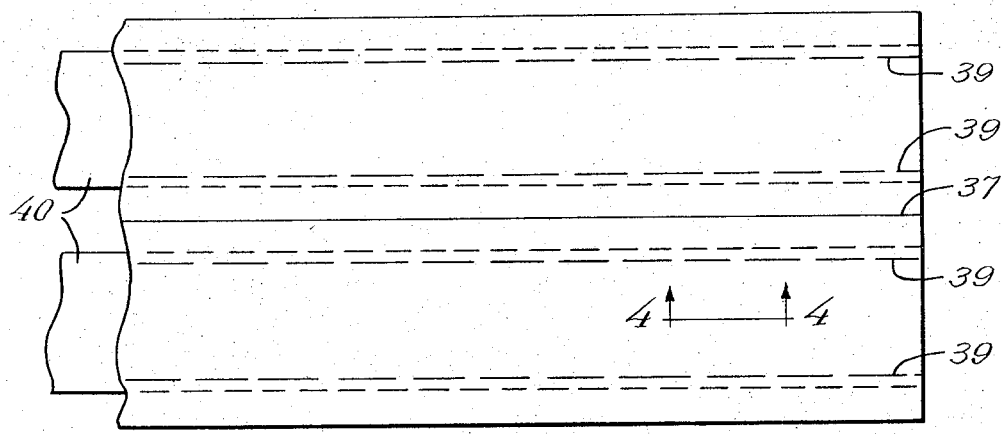
FIGURE 3 is a plan view of a portion of a typical web formed on the corrugator.
Figure 4:
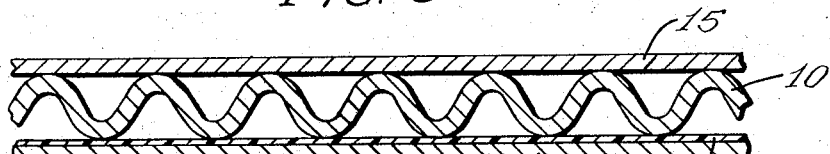
FIGURE 4 is an enlarged longitudinal sectional view of the web of FIGURE 3, the position of the section being indicated by the line 4—4 of FIGURE 3.

FIGURES 1 and 2 show a typical apparatus for forming corrugated board, the structure shown in FIGURE 1 comprising the apparatus for adhering a corrugated medium to a liner, and the structure in FIGURE 2, showing, in effect, a continuation of the structure shown in FIGURE 1 and including the means for applying the second liner to the single-face corrugated web formed in the apparatus shown in FIGURE 1.

As indicated in FIGURE 1, the corrugated web 10 is fed from the supply roll 11 between a pair of corrugating rollers 12 and 13 which corrugate the web 10. As the corrugated web passes about the corrugating roller 12, adhesives is applied from the glue roller 14 which applies adhesive to the flutes of the corrugations. As the web continues its travel about the roller 12, the liner 15 is pressed thereagainst by means of a pressure roller 16, the liner being drawn from a supply roll 17.

The liner 15 with the corrugated web 10 thereupon is directed past guide rollers such as 19 and 20 to an endless conveyor 21 upon which it is accumulated.

The endless conveyor 21 is of sufficient length to permit the adhesive to set sufficiently so that the corrugated medium and the liner will not separate. The single-face corrugated web thus formed, which may be indicated by the numeral 22, is directed partially about drums or rollers 23 and 24 and between a pair of compression rollers 25 and 26. Glue is applied to the surfaces of some of the flutes by suitable glue-applicating wheels 27. The second liner is fed from a roll 29 and goes over suitable guide rollers such as 30 and 31 and between the compression rollers 25 and 26. Preferably, the web 32 from the roll 29 has areas of the outer surfaces coated with a film of polyethylene or other polyolefin film. Alternatively, it is possible to feed one or more webs of polyolefin film 33 from a roller 34. However, this process is considerably more difficult and more costly because of the fragile nature of the film. The glue wheels 27 are arranged so that they will apply glue only to areas of the corrugated medium which will be adhered directly to uncoated areas of the web.

After the single-face web 22 is combined with the liner 32, the double-face corrugated web thus formed passes over an elongated dryer section including a series of heaters 35 which are heated to a high temperature by steam under pressure or by other suitable means. For example, the temperature may correspond to temperature of steam under pressure of one hundred twenty-five pounds per square inch. An endless belt 36 holds the corrugated web against the heaters during this travel. The belt 36 tends to move the corrugated web over the heaters. The corrugated web is also propelled by passing between a pair of conveyor belts, not illustrated in the drawings, after the web has been dried to the necessary extent.

During the passage of the web over the heaters, the liner 32 is treated to a temperature necessary to partially melt the polyethylene or other polyolefin film. As a result, the film forms an adhesive which secures the liner to the corrugated medium. If the polyolefin film extends entirely across the web of double-faced corrugated, the glue rollers 27 are not necessary.

Figure 5:
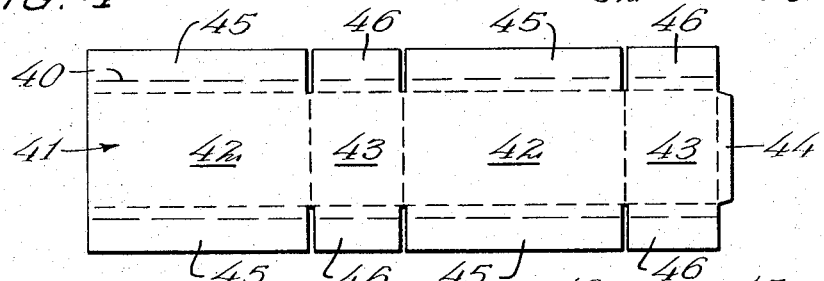
FIGURE 5 is a diagrammatic view of a blank from which a container may be formed.
Figure 6:
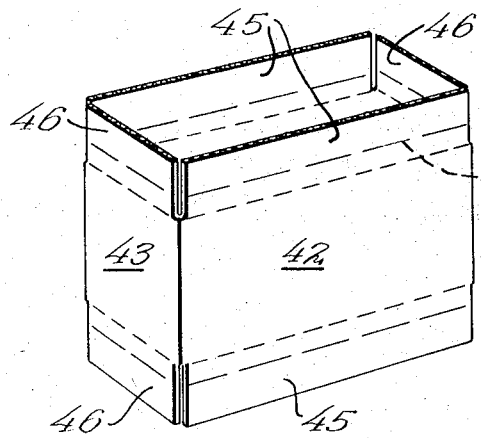
FIGURE 6 is a perspective view of the blank shown in FIGURE 5 secured in tubular form.
Figure 7:
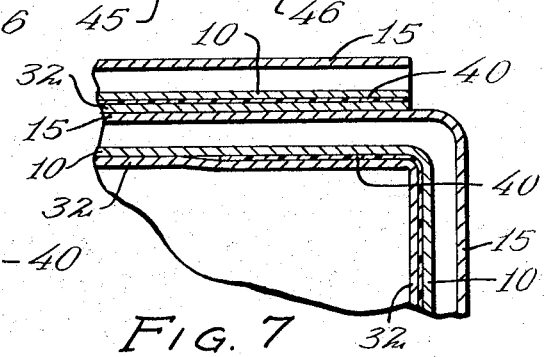
FIGURE 7 is an enlarged section through a portion of the closure of the container shown in FIGURE 6.

With reference now to FIGURE 3 in the drawings, an area of the completed web is illustrated. The width of the web is centrally slit along the line 37 so that the portion of the web on each side of this slit may be used for forming container blanks. Each of these areas is longitudinally creased as indicated at 39, the creases 39 being located to connect the walls of the container to the closing flaps. The liner 32 may be formed of a single sheet of paperboard having two bands 40 of polyethylene coated upon the inner surface thereof, or to the surface which will be affixed to the corrugated medium. Alternatively, the liner 32 may comprise two side-by-side webs of liner each having a central band 40 of polyethylene thereupon. The bands of polyethylene are shown as extending beyond the remainder of the web merely to show the width of the band. It will be noted that the bands 40 are of sufficient widths to extend beyond the crease lines 39. As a result, the polyethylene will extend throughout the height of the walls and partially into the flap. FIGURE 5 illustrates one of the completed blanks 41 while FIGURE 6 shows the blank in the tubular form including side walls 42, end walls 43, and a glue or stitch flap 44. The side walls 42 include closing flaps 45 while the end walls 43 have end wall flaps 46. The polyolefin film 40 extends through the entire area of the side and end walls 42 and 43 and partially into the closure flaps 45 and 46.

When the containers of the type disclosed in FIGURE 6 are used for the packaging of meat such as a ham, there is usually considerable moisture present because of the fact that the hams are injected with water after they have been cooked in order to return the moisture content to its original percentage. With the particular cases illustrated, the closing flaps at one end of the container are closed and stitched or glued in closed position. The containers are then filled with the product and the other end is closed. During this process much of the free water will drain out between the bottom closing flaps. After the containers have been closed, they are rotated so that the end closures are on the sides of the containers and the side walls 42 form the top and bottom panels. When in this position, the meat rests upon the liner 32. As a result, the moisture in the meat is permitted to soak into the paper forming the liner 32 but cannot soak through the film 40 to be absorbed in the corrugated medium 10. It is further reasoned that the provision of the paperboard liner in contact with the meat is very desirable. In tests made using the polyolefin film on the inner surface in contact with the meat, the moisture gathered in pools on the plastic film.

While it has been relatively common to extrude polyethylene film on linerboard for use in fabricating double-faced corrugated board, the plastic film normally formed the outer surface of the corrugated web. For certain purposes such as the specific case mentioned, having the paper surface on the outside of the web is advantageous. Furthermore, by forming the web in the manner described, the use of adhesives for securing the liner to the corrugated medium may be eliminated.

In accordance with the patent statutes, I have described the principles of construction and operation of my improvement in corrugated paperboard and method of making the same; and while I have endeavored to set forth the best embodiment thereof, I desire to have it understood that obvious changes may be made within the scope of the following claims without departing from the spirit of my invention.

I claim:
1. A method of forming double face corrugated paperboard having a moisture proof corrugated medium comprising the steps of:
    corrugating a web of paperboard,
    applying adhesive to one side thereof,
    applying a first liner to the adhesively coated side of said corrugated web,
    extruding a film of polyolefin material upon a second liner,
    applying the polyolefin coated surface of the second liner to the other surface of the corrugated web,
    subjecting the second liner to heat sufficient to render the film tacky and to adhere the second liner to the corrugated web.

2. The method of claim 1 and in which the polyolefin web is less than the full width of the corrugated medium, and
    applying adhesive to the other surface of the corrugated web in the areas thereof not covered by the polyolefin film.

3. The method of claim 1 and including the further step of forming container blanks of the double-faced corrugated board.

4. The method of claim 2 and including the further step of creasing the double-faced corrugated web along parallel lines into container blanks, the polyolefin film extending at least the full width of the area between the creases.

5. A method of producing double face corrugated paperboard having a moisture-proof barrier including the steps of:
    corrugating a paperboard web,
    adhering a paperboard liner to one surface of the web to provide a single face corrugated web,
    applying a web of polyolefin film to the other surface of the corrugated web, the polyolefin web being narrower than the full width of the corrugated web,
    applying adhesive to said other surface of the corrugated web in the area thereof not covered by the polyolefin film prior to applying a second paperboard liner thereto,
    applying said second liner to the surface of the web of polyolefin film and to the exposed surfaces of the corrugated web, and
    heating the double face corrugated web to render the polyolefin film tacky to cause the same to adhere to the corrugated web and the second liner.

6. The method of claim 5 and in which the polyolefin film is preapplied to the second liner.

7. The method of claim 6 and in which the polyolefin film is applied as a separate web.

References Cited by the Examiner

UNITED STATES PATENTS

| | | | |
|---|---|---|---|
| 1,592,824 | 7/1926 | Fairchild | 156—210 |
| 2,774,698 | 12/1956 | Jenk et al. | 161—250 |
| 2,800,840 | 7/1957 | Herrick | 156—207 |
| 2,856,323 | 10/1958 | Gordon | 161—124 |
| 2,982,333 | 5/1961 | Little | 161—137 |
| 3,015,596 | 1/1962 | Couch et al. | 229—3.1 |
| 3,033,708 | 5/1962 | McKee | 156—210 |
| 3,085,731 | 4/1963 | Wilkins | 229—3.1 |
| 3,103,459 | 9/1963 | Kane | 264—286 |
| 3,142,599 | 7/1964 | Chavannes | 156—210 |
| 3,185,604 | 5/1965 | Cameron | 156—210 |

EARL M. BERGERT, *Primary Examiner.*

FRANKLIN T. GARRETT, *Examiner.*

V. A. TOMPSON, H. F. EPSTEIN, *Assistant Examiners.*